Aug. 22, 1961 W. T. EVANS 2,997,690
APPARATUS FOR DISPLAY OF SEISMIC SIGNALS
Filed June 29, 1954 4 Sheets-Sheet 1

*INVENTOR.*
WILLIAM T. EVANS
BY
ATTORNEYS

INVENTOR.
WILLIAM T. EVANS

INVENTOR.
WILLIAM T. EVANS

INVENTOR.
WILLIAM T. EVANS

United States Patent Office 2,997,690
Patented Aug. 22, 1961

2,997,690
APPARATUS FOR DISPLAY OF SEISMIC SIGNALS
William T. Evans, Beaumont, Tex., assignor to Sun Oil Company, Philadelphia, Pa., a corporation of New Jersey
Filed June 29, 1954, Ser. No. 440,129
6 Claims. (Cl. 340—15)

This invention relates to apparatus for the display of seismic signals and, more particularly, to apparatus for reproducing on the screen of a cathode ray oscilloscope simultaneously recorded portions of each of a plurality of seismic records selected during a predetermined time interval.

In the art of seismic surveying, it has long been customary to create a localized disturbance in the earth and to produce simultaneous records with respect to time on a record member of the vibrations resulting from the disturbance at a plurality of detectors differently located with respect to the source. These records, which may be thirty or forty in number, and which are generally simultaneously recorded on a single multichannel record member, exhibit certain characteristics primarily due to reflections of seismic waves from subsurface boundaries but individually modified and displaced by various factors such as conditions of the weathered earth layer in the vicinity of each detector, the individual elevation of each detector, the difference in displacement between each of the detectors and the localized disturbance, and the slopes of various subsurface strata from which the reflected waves reach the individual detectors.

It is common practice to differentially adjust the positions of various portions of the records with respect to each other in record reproducing and rerecording means in order to make corrections for one or more of these various displacements throughout the length of a recording. Apparatus for accomplishing these differential displacements is disclosed in the patent application of Bazzoni, Ellis and Winterhalter, Serial No. 339,882, filed March 2, 1953, now U.S. Patent No. 2,950,459.

Heretofore it has been common practice to reproduce positionally adjusted records on a photographic film in order that the records may be examined and compared and, thereafter, the record differential positioning apparatus be readjusted as may be considered desirable as a result of the study and a subsequent reproduction of relatively adjusted recordings made and examined. By successively carrying out this trial and error method of positionally adjusting the various records, records may ultimately be produced in which various portions of the individual records are in such side by side relation or may be combined as to provide more clearly indications of the nature of the subsurface strata existing in the region in which the disturbance was created.

In addition to the foregoing, seismic records when originally obtained in the field include a considerable amount of unwanted noise resulting from other earth vibrations of the type, for example, emanating from local power lines, the effects of wind in trees, water flowing in river beds, and various other sources. It is necessary that these extraneous noises be filtered from the records in order that the records may be interpreted.

It is also customary to combine a plurality of individual seismic records into a single recorded channel. Proper combination of a plurality of records serves to accentuate or amplify the desired information and simultaneously serves to minimize or cancel out many of the undesired vibrations. However, before seismic signals are combined in this manner, they are generally individually corrected, as noted above, in order that the portions of the recordings relating to equivalent subsurface conditions are in superimposed relation in the final combined recording.

It will be evident that the foregoing procedures which may be employed independently or which may be employed in various combinations and sequences involve the making of numerous photographic recordings for examination which, in turn, involves both considerable inconvenience and delay.

It is an object of this invention to provide apparatus by means of which there may be simultaneously displayed on the screen of a cathode ray oscilloscope portions of each of a plurality of rerecorded filtered, combined and/or positionally adjusted records, the portions being selected during a predetermined time interval from any predetermined part of the record member. After the displayed selected portions of the rerecorded records have been observed, the record filtering, combining and/or positioning apparatus may be readjusted and a subsequent rerecording made which is thereafter played into the display apparatus and the records again observed. It will be evident that the display apparatus will greatly facilitate a repeated making of the various adjustments in the record filtering, combining and/or position adjusting apparatus. Filtering and/or combining apparatus may, if desired, be incorporated directly in the apparatus hereinafter described. On the other hand, filtering, combining and/or position adjusting apparatus may be employed separately in which case it is a relatively easy matter to produce, for example, a magnetic record rather than a photographic record and to play the magnetic record into the apparatus for displaying portions of the records side by side on the screen of an oscilloscope.

It is a further object of the invention to provide display apparatus which may involve the use of a multigun oscilloscope in order that a large number of individual records may be simultaneously viewed.

These and other objects of the invention relating particularly to the apparatus involved will become evident from the following description when read in conjunction with the accompanying drawings, in which.

Figures 1, 2:
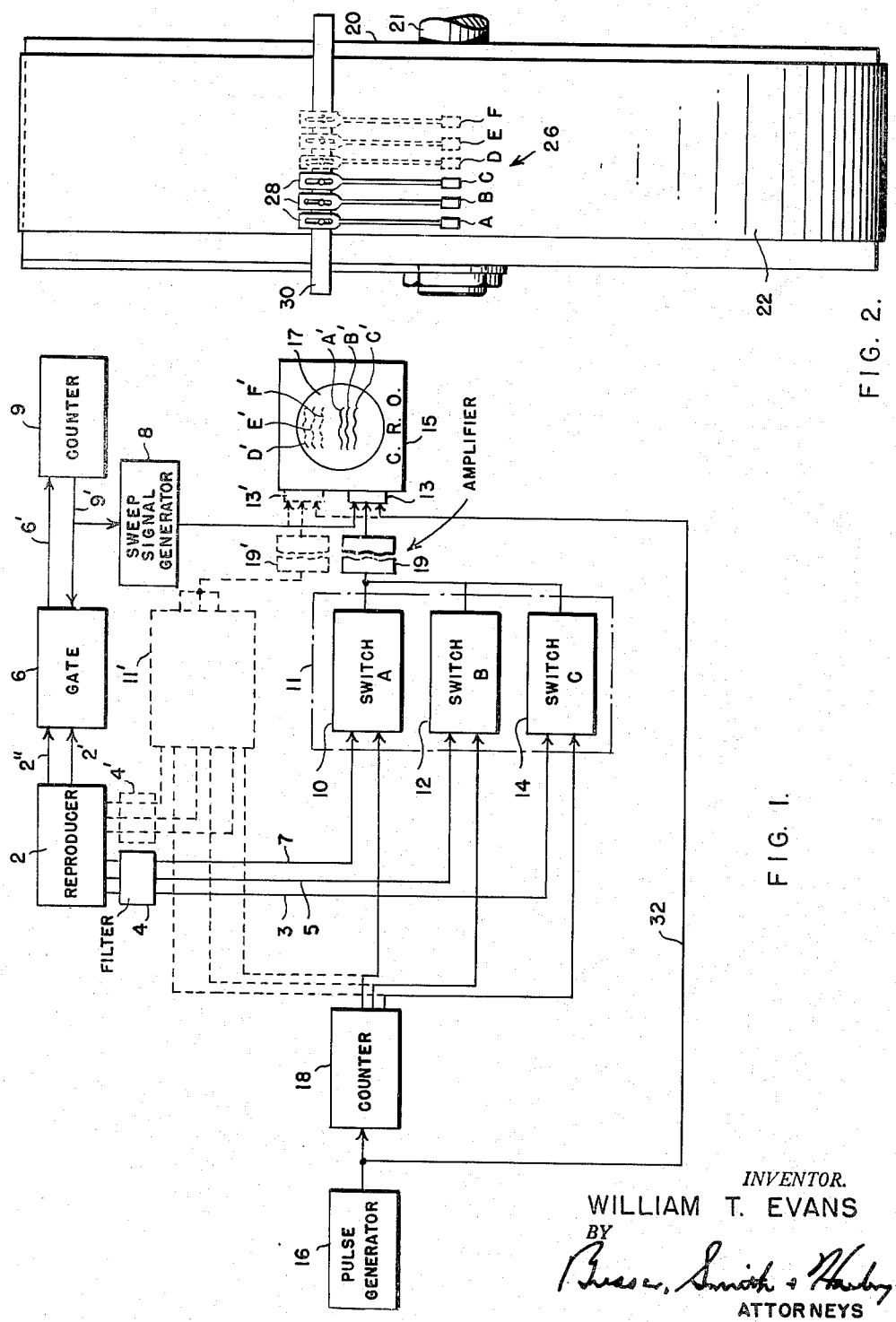
FIGURE 1 is a diagrammatic showing of the apparatus involved in carrying out the invention.
FIGURE 2 is a fragmentary showing of a portion of the apparatus shown diagrammatically in FIGURE 1.

This display apparatus includes a multichannel reproducer 2 which is arranged to reproduce from a magnetic tape a plurality of side by side magnetic records which have been recorded in positionally adjusted relation on a record strip by means of apparatus such as, for example, that referred to in the above noted patent application, the photographic recording means shown in the application being preferably replaced by magnetic recording means for the purpose of producing the particular records employed herein. The output of the multichannel reproducer is delivered to conventional filter circuits as shown at 4 and 4'. These filter circuits serve to filter out unwanted noises in order to improve the appearance of the records and to facilitate interpretation of the records. Filter circuits of this type are well known in the art and need not be disclosed in detail herein. It is further noted, as previously mentioned, that if desired filter circuits may be employed separately from the apparatus disclosed herein and filtered records fed through the reproducer 2. In this case the filters 4 and 4' would be omitted.

The groups of conductors passing through the filters 4 and 4' are shown by way of illustration. It will be evident that the total number of groups will be selected to provide input to a sufficient number of guns in order that a desired number of record channels may be simultaneously viewed. It will also be evident that a multigun oscilloscope is preferably employed in order that the various reproduced record channels may be displayed on a single screen.

The three conductors 3, 5 and 7 carrying the reproducer output from three record channels of the recording are connected to three switching circuits indicated at 10, 12 and 14, respectively, within an outline 11.

A pulse generator 16 provides timing pulses to a three-stage ring counter circuit 18. The output from each stage of the counter circuit is fed to one of the switch circuits 10, 12 and 14 in order to selectively control each of the three switching circuits to pass successive small increments of the signals delivered thereto from the reproducer 2. The outputs of each of the switch circuits 10, 12 and 14 are delivered through an amplifier 19 to a gun 13 of a cathode ray oscilloscope 15. The outputs of each of the switch circuits 10, 12 and 14 are at slightly different voltage levels and thus the base lines for the various record traces A', B' and C' appearing on the screen 17 of the cathode ray tube will be separated vertically. If the frequency at which the pulses are produced by the pulse generator 16 is sufficiently high, the record traces A', B' and C' will appear on the screen of the tube as three substantially uninterrupted waves.

The reproducer includes a rotatable drum 20. The circumference of the drum is a sufficient extent to accommodate the length of a record strip 22 which is mounted on the peripheral surface of the drum. The drum is mounted on a shaft 21 and rotated by suitable driving means connected to the shaft 21. A plurality of pick-up heads, indicated generally at 26, are positioned over the record strip 22 and over record channels thereon. The number of heads employed will, of course, be equal to the number of channels being reproduced. The heads A, B and C are adapted to pick up, from these record channels on the tape, the signals which are delivered from the reproducer to the three conductors 3, 5 and 7 and shown on the screen of the oscilloscope as A', B' and C'.

The pick-up heads are mounted on slotted arms 28 which are, in turn, adjustably affixed to a support bar 30. While generally time phase adjustments among the various record channels will be made prior to the reproducing of the records in the reproducer 2 by means of apparatus such as that described in the above mentioned patent application, the pick-up head mounting disclosed herein permits relative time phase positioning of the individual records if desired in conjunction with the viewing of the records. It is further noted that, when the present apparatus is used to mix two or more record channels, the outputs from groups of pick-up heads will be fed to the conductors 3, 5 and 7 shown in FIGURE 1 so that each of the conductors carries a signal composed of a plurality of recordings from the record strip 22.

In order that the portions of the recordings which are to be viewed may be selected as beginning at any desired portion of the recording, a sweep signal generator 8 is employed which is controlled by a gate 6 and a counter 9. When seismic records are produced, there is recorded along with the seismic records a signal indicating the start of the record and a timing signal by which time may be measured along the length of the record. This timing signal is generally selected as being a 100 cycle alternating current signal. The start signal is delivered to the gate 6 through conductor 2' and the 100 cycle timing signal is delivered to the gate through conductor 2". The start signal serves to open the gate and the timing signal is then passed to the counter 9 through conductor 6'. The counter 9, which may be any one of a number of commercially available cycle counter type of timers, is preset to emit a signal after it has counted a predetermined number of cycles. This signal is returned to the gate through conductor 9' and serves to close the gate. The same signal is delivered to the sweep signal generator 8 and triggers the sweep signal generator. The output of the sweep signal generator is fed to the oscilloscope gun 13. By setting the counter 9 to trigger the sweep signal generator and to close the gate at any number of cycles after the start signal, the operator is able to initiate the sweep at any number of hundredths of a second after the shot instant and to have it repeat at the same instant for each successive traverse of the looped record strip 22. In this way the delay interval is measured in units on the record time scale independently of tape velocity.

The sweep signal generator may be of generally conventional type except that it should be so adjusted that repetitions of the sweep cycles do not occur automatically due to its own relaxation condition but only due to keying. The keying means described is connected to the grid of the sweep signal generator thyratron so as to fire the thyratron to discharge the sweep circuit condenser and thus initiate a sweep cycle. Such discharge will cause a deflection of the electron beam to the left of the cathode ray screen 17, as viewed in FIGURE 1, whereupon the beam will move to the right across the screen at a rate dependent upon the time constant of the sweep condenser charging circuit. It will be evident that the time through which the sweep occurs through the useful horizontal range may be adjusted in a conventional manner by adjusting the time constant by the selection of suitable condensers and their charging resistances. Thus the useful length of the seismic record which appears on the screen of the oscilloscope is adjusted. As the condenser approaches full charge, the beam will remain in substantially a fixed right-hand position, the indications then being unused. Upon each rotation of the drum 20, the sweep cycle will be reinitiated by the operation of the gate 6 and the counter 9.

The output from the pulse generator 16 is also used to apply a negative pulse through conductor 32 to the grid of the cathode ray tube gun 13 to blank the beam during switching from one record channel to another.

The heads D, E and F are adapted to pick up signals from three additional record channels of the record strip 22 and to deliver those records through the filter 4' to switch circuits 11'. The outputs of the counter 18 are delivered to the switch circuits 11'. The output of the switch circuits 11' is delivered through a second amplifier 19' to a second gun 13' of the cathode ray oscilloscope 15. The records of channels picked up by heads D, E and F will then appear on the screen 17 of the cathode ray oscilloscope as traces indicated at D', E' and F' in alignment with the traces A', B', and C'. It will be evident that the number of groups of pick-up heads and the number of sets of switch circuits, amplifiers, and guns will be selected, as previously noted, to provide display of a desired number of record channels.

It will be evident that, with the record member placed on the drum 20 and the drum rotated at a speed in excess of fifteen revolutions per second, only those portions of the records will appear on the oscilloscope screen which extend from the time place of setting of the counter 9 for a time represented by the time of the sweep signal produced by the sweep signal generator 8, and these portions, due to their repetition, will appear stationary due to persistence of vision even if the oscilloscope screen is of short persistence type. With a long persistence screen, the rotations of the drum may be at a lesser rate. The point of beginning of the displayed signal is established by the setting of the counter 9 and the length of the displayed signal is established by the slope of the sweep signal. The frequency of the pulses produced by the pulse generator 16 is selected so that the increments of the records will be sufficiently closely spaced that the displayed records will appear as continuous and uninterrupted traces.

While the reproducer 2 has been described in conjunction with the record member 22 shown in FIGURE 2 as reproducing a plurality of records from a multichannel magnetic record member, it will be evident that other types of reproducers may be employed in conjunction with other types of recordings such as, for example, a reproducer for reproducing separate records from a magnetic record member having a single channel in which are recorded a plurality of high frequency signals modulated individually by the seismic signals or, alternatively, a reproducer suitable for reproducing photographic records. Any of these or other type of reproducing means may be employed.

Figure 3:
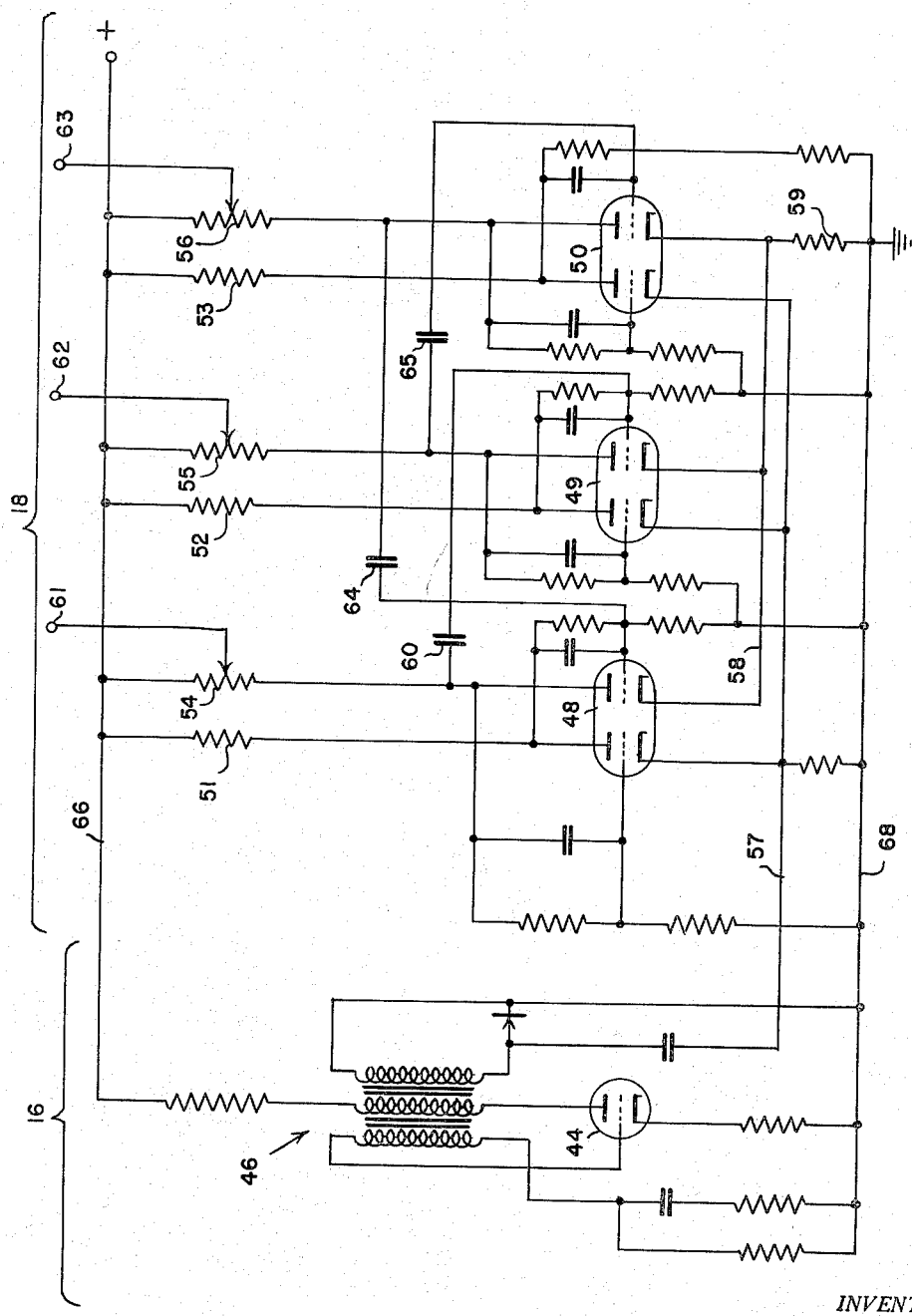
FIGURE 3 is an electrical diagram of the pulse generator and the counter shown in FIGURE 1.

FIGURE 3 shows circuits desirably employed for the pulse generator 16 and the counter 18. The pulse generator 16 is a conventional blocking oscillator pulse generator including a triode 44 connected in feedback arrangement through a transformer indicated at 46. The oscillator is connected between a conductor 66 connected to a suitable source of positive potential and a grounded conductor 68. The output of the oscillator is fed to the three-stage counter 18 through conductor 57.

The counter is a three-stage ring type counter of known type having for each stage a pair of triodes, shown as twin triodes 48, 49 and 50. The left-hand plates of each of the tubes 48, 49 and 50 is connected through a resistor 51, 52 and 53, respectively, to the positive potential conductor 66. The right-hand plate of each of the tubes 48, 49 and 50 is connected through a resistor 54, 55 and 56, respectively, to the positive potential conductor 66. The left-hand cathode of each of the tubes 48, 49 and 50 is connected to the conductor 57 which is connected to the output of the blocking oscillator. The right-hand cathodes of the tubes are connected to a conductor 58 which is in turn connected to the ground conductor 68 through a resistance 59. The grid of each of the triodes of each tube is connected in feedback relation with the plate of its twin. The right-hand plate of each of the tubes 48, 49 and 50 is also connected to the right-hand grid of each succeeding twin triode of the ring through condensers 60, 65 and 64, respectively. This is a typical arrangement which serves to maintain the correct switching sequence around the ring.

For any stable state of the counter, only one stage will be in an "on" condition having its left triode non-conducting and its right triode conducting. Each of the other stages will be in an "off" condition having its left-hand triode conducting and its right-hand triode non-conducting. During the "off" condition of any tube, the plate potential of its right-hand triode will be substantially that of the conductor 66 connected to positive power. When a tube is in an "on" condition with its right-hand triode conducting, the plate potential of its right-hand triode will be a low positive value.

If the "on" condition prevails in tube 48 and its right triode is conducting and its left triode non-conducting, the current in the plate load resistor 51 is very low and the potential between the plate of the left-hand triode of tube 48 and ground will be high compared to the potentials between ground and the plates of the left-hand triodes of tubes 49 and 50. Successive negative pulses applied through line 57 to the cathodes of the left-hand triodes of each of the tubes 48, 49 and 50 will drive the "on" condition from one stage to the next around the ring. The pulses produced by the blocking oscillator 16 may have any recurring frequency over a wide range. The frequency must, however, be sufficiently high to provide switching at such a rate that the individual traces appearing on the oscilloscope will appear to be substantially continuous.

The output of the first stage of the ring counter is taken at terminal 61 which is connected to the mid point of resistor 54 which is the plate load resistor for the right-hand triode of tube 48. The output of the second stage of the counter is taken from the terminal 62 which is connected to the mid point of resistor 55 which is the plate load resistor of the right-hand triode of the tube 49, and the output of the third stage of the counter is taken from the terminal 63 which is connected to the mid point of a resistor 56 which is the plate load resistor of the right-hand triode of the tube 50. Negative pulses are delivered for control through these terminals.

It will be evident that this three-stage ring counter may be extended to include more than three stages. The three stages, as described, are of course, selected in accordance with the three signals carried by the conductors 3, 5 and 7 from the reproducer to the three switches. If a greater number of signals are delivered to one gun of the oscilloscope, the counter will, of course, have that many stages.

Figure 4:
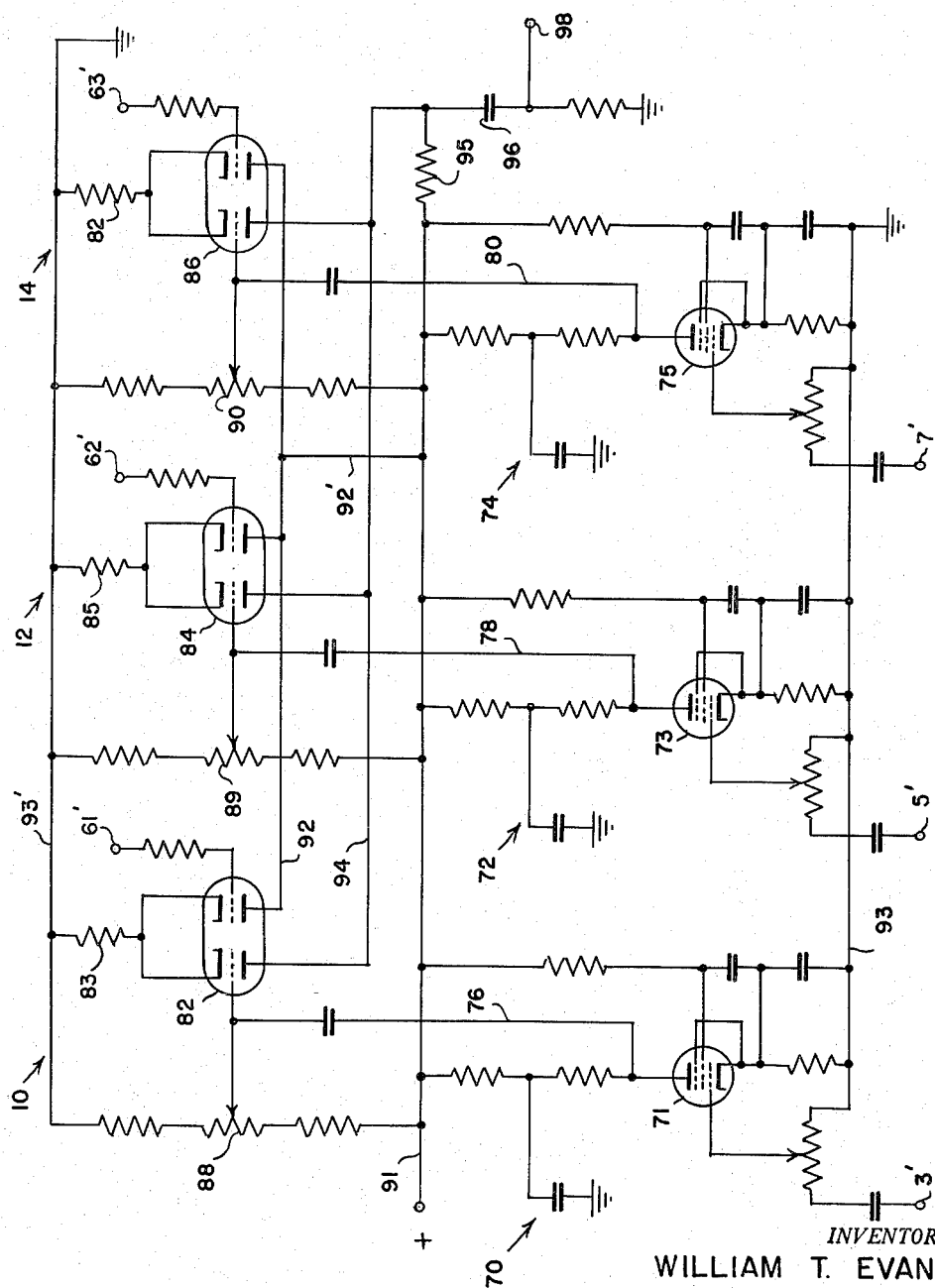
FIGURE 4 is an electrical diagram of the switches shown in FIGURE 1.

In FIGURE 4 there are shown circuits of the three switches 10, 12 and 14 indicated diagrammatically in FIGURE 1. Each of the switching circuits includes a preamplifier indicated generally at 70, 72 and 74. The preamplifiers are conventional pentode amplifiers with low frequency compensation. Each of the preamplifiers 70, 72 and 74 includes a pentode 71, 73 and 75, respectively, having its cathode connected through a self-biasing resistance to a ground conductor 93 and its anode connected through a load resistance to a conductor 91 which is, in turn, connected to a source of positive potential.

Signals from the reproducer 2 are delivered to the terminals marked 3', 5' and 7', respectively, of the three preamplifiers 70, 72 and 74 and are fed to the control grids of the pentodes 71, 73 and 75, respectively, these signals being, of course, the records reproduced by pickup heads A, B and C from the record tape 22. The output of each of the pentodes 71, 73 and 75 is fed from its plate circuit through one of conductors 76, 78 and 80, respectively, to the grid of the left-hand triode of a corresponding one of twin triodes 82, 84 and 86, respectively, provided in the switching circuits 10, 12 and 14, respectively. The preamplifiers 70, 72 and 74 are provided to bring the signal up to a fairly high level before switching in order to reduce the amount of later amplification required which would also amplify noise introduced from the switching process.

The twin triode 82 has its cathodes connected together and connected through a resistor 83 to a ground line 93'. The left-hand grid of the twin triode 82 is connected to the tap of a potentiometer 88 connected between a positive potential line 91 and the ground conductor 93'. The cathodes of the tube 84 are connected together and connected through a resistor 85 to the ground conductor 93'. The grid of the left-hand triode of the tube 84 is connected to the tap of a potentiometer 89 connected between the ground conductor 93' and the positive potential conductor 91. The twin triode 86 has its cathodes connected to the ground conductor 93' through a resistor 82 and has the grid of its left-hand triode connected to the tap of a potentiometer 90 connected between the ground conductor 93' and the positive potential conductor 91. The plates of the right-hand triodes of tubes 82, 84 and 86 are connected together through conductor 92 and are connected to the positive potential conductor 91 through a conductor 92'. The left-hand plates of the tubes 82, 84 and 86 are connected together through conductor 94 and through a common load resistor 95 to the positive potential supply line 91.

The output connections 61, 62 and 63 of the three-stage ring counter 18 are connected to the grids of the right-hand triodes of the tubes 82, 84 and 86 at terminals 61', 62' and 63', respectively. As previously described, the operation of the three-stage counter is such that only one of the right-hand triodes of tubes 48, 49 and 50 is conducting or "on" at any one time. If this "on" counter tube is the tube 48 having its output connected through line 61' to the grid of the right-hand triode of the tube 82, this grid will have a low potential. The potentiometer 88 is so adjusted that the grid of the left-hand triode of tube 82 has the proper bias for linear operation when it is conducting. Potentiometers 89 and 90 associated with the grids of the left-hand triodes of tubes 84 and 86, respectively, are similarly adjusted. Potentiometers 88, 89 and 90 are also adjusted so that the left triodes of tubes 82, 84 and 86 operate at slightly different voltage levels to provide a vertical spacing between adjacent traces on the cathode ray tube screen.

When a counter tube 48, 49 or 50 is in the "off" condition, the potential at the grid of the right-hand triode of its associated switch tube 82, 84 or 86, respectively, is relatively high causing this triode to conduct heavily and the voltage drop across the common cathode resistor to bias the left-hand triode of the tube to cut off. Thus, at any time the current through the common load resistor will be the plate current of one left-hand triode only of the tubes 82, 84 and 86, and only the signal applied to its grid will be delivered to the terminal 98. A single counter control may be employed with a plurality of switch circuits as indicated at 11 and 11' in FIGURE 1 due to the fact that the counter circuit output is connected to the high impedance grid inputs of the switch circuits.

The switching rate employed is sufficiently high that capacitive coupling in the form of condenser 96 may be satisfactorily employed. The output signals are delivered to termnial 98 from which they pass through a suitable amplifier 19 to the vertically deflecting plates of the oscilloscope gun.

Figure 5:
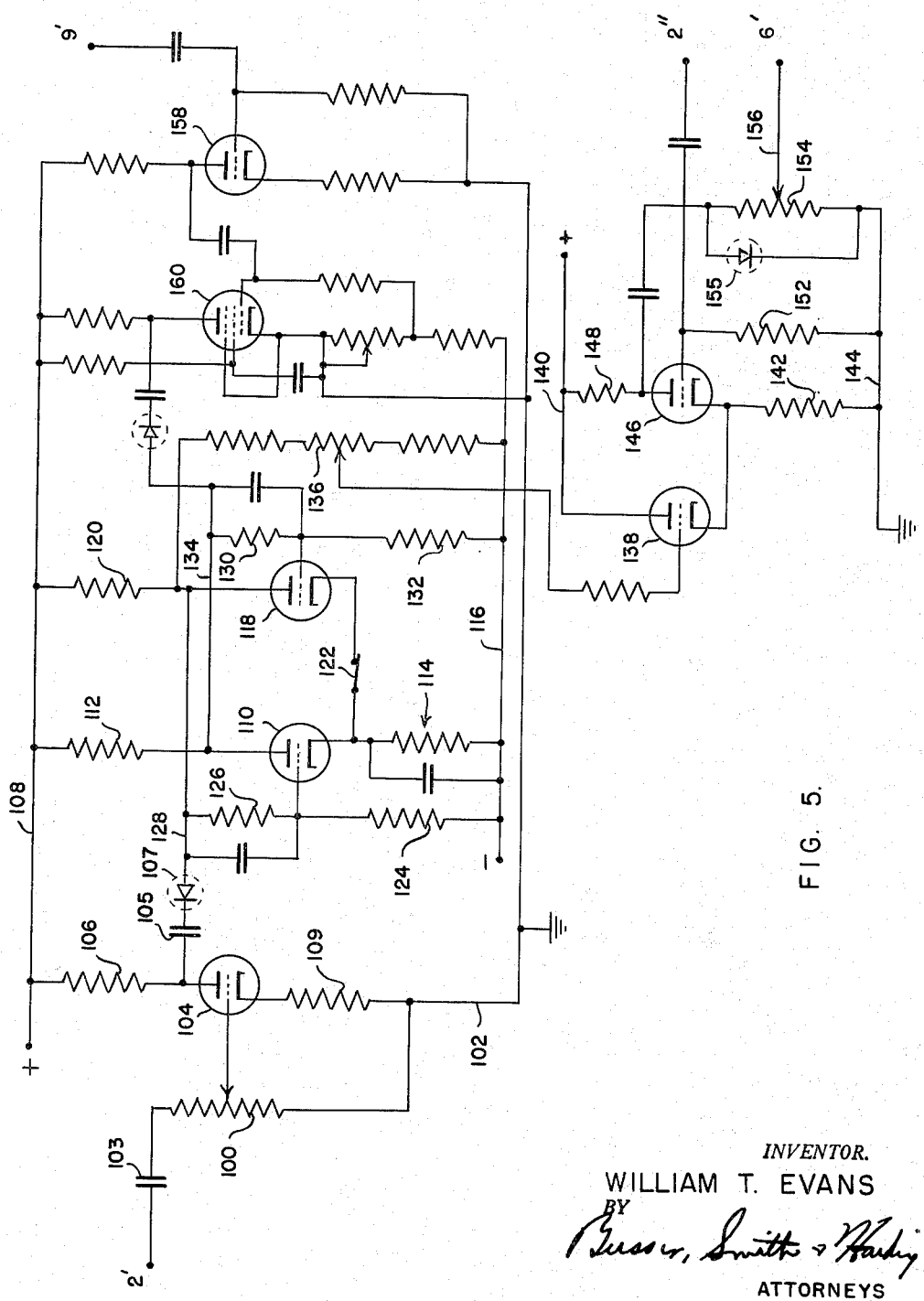
FIGURE 5 is an electrical diagram of the gate shown in FIGURE 1.

FIGURE 5 shows the circuit of the gate 6. The conductor 2' is connected to one side of a potentiometer 100. The other side of the potentiometer 100 is connected to a ground conductor 102. An adjustable arm of the potentiometer 100 is connected to the control grid of a triode 104. The anode of the triode 104 is connected through a suitable plate load resistor 106 to a positive potential carried by conductor 108. The cathode of the triode 104 is connected to the ground line 102 through a suitable cathode resistance 109. This arrangement provides a conventional triode amplifier which is provided with input and output coupling condensers 103 and 105, respectively. The potentiometer 100 serves as a grid resistor and input attenuator.

A triode 110 has its anode connected to conductor 108 through a resistor 112 and its cathode connected to a negative potential line 116 through a parallel arrangement of a capacitor and resistor as indicated at 114. A triode 118 has its anode connected to the positive potential conductor 108 through a resistance 120 and has its cathode connected to the cathode of the tube 110 through a switch 122. The grid of the tube 110 is connected between resistors 124 and 126. The opposite end of resistor 124 is connected to the negative potential line 116 and the opposite end of the resistor 126 is connected to a line 128 which, in turn, is connected through a rectifier and a condenser to the anode of the tube 104. The line 128 is also connected to the anode of tube 118. The control grid of tube 118 is connected between resistors 130 and 132. The opposite end of the resistor 132 is connected to the negative potential line 116 and the opposite end of the resistor 130 is connected to an anode of tube 110 through a conductor 134. The anode of tube 118 is connected to the negative conductor 116 through a potentiometer 136. The tubes 110 and 118 which may be in the form of a twin triode provide, in conjunction with the associated circuit components, a conventional grid-plate coupled bistable switch circuit. The configuration of the circuit is such that only one triode, 110 or 118, can be conducting at any one time.

In the "ready" or "gate closed" condition, tube 110 is conducting through plate load resistor 112 and cathode resistor 114. Due to the voltage drop in the load resistor 112, the plate potential of tube 110 is low compared to that of tube 118, which is not conducting. The cathode potentials are the same since the cathodes are connected together to the common cathode resistor 114 and equal to the grid potential of the conducting tube 110 plus the characteristic bias for the tube voltage and current conditions. The grid potential of tube 110 is taken from the voltage divider consisting of the resistors 126 and 124 connected from the plate of tube 118 to the negative lead 116. The grid potential of tube 118 is taken from the voltage divider consisting of the resistors 130 and 132 connected from the plate of tube 110 to the negative potential lead 116. Since the plate potential of tube 110 is low compared to the plate potential of tube 118, the grid potential of tube 118 is low compared to the grid potential of tube 110 and to the potential of the cathodes so the tubes tend to remain stable in this condition.

The movable arm of the potentiometer 136 is connected to the grid of a triode 138. The anode of the triode 138 is connected to a conductor 140 which carries a positive potential. The cathode of the tube 138 is connected through a resistor 142 to a ground conductor 144. A triode 146 has its anode connected to the conductor 140 through a resistor 148 and has its cathode connected to the cathode of tube 138 and to the ground line 144 through the resistor 142.

The timing signal received from the record tape to conductor 2'' is connected to the grid of triode 146. The grid of tube 146 is connected to the ground line 144 through a resistor 152. The anode of tube 146 is also connected through a potentiometer 154 to the ground conductor 144. The movable contact 156 of the potentiometer 154 is connected to the counter through conductor 6'. A diode rectifier 155 is connected across the resistor 154.

The stop pulse produced by the counter 9 is delivered to the gate circuit through conductor 9'. This conductor is connected to the grid of a triode 158, the output of which is connected to the control grid of a pentode 160. The triode 158 and pentode 160 are connected as amplifiers. The output of the pentode 160 is delivered to the anode of the tube 110 and to the control grid of the tube 118.

When the gate circuit is in the "ready" state, i.e., with the gate closed, the tube 110 is conducting, and the tube 118 is non-conducting. Under this condition the voltage of the plate of the tube 118 is relatively high and thus the voltage impressed upon the grid of tube 138 taken from the potentiometer 136 is relatively positive, and the voltage of the grid of tube 138 is relatively high and the tube 138 conducts heavily through the common cathode resistor 142 biasing the tube 146 to cut off so that no signal can pass through it. Under these conditions the timing signal coming from the reproducer through conductor 2' cannot pass through the triode 146 and is, therefore, not delivered to the counter 9 through conductor 6'.

When a start pulse enters the delay circuit through conductor 2' from the reproducer, the pulse is amplified by the tube 104 and passes through the coupling condenser 105 and a diode rectifier 107 to the grid of tube 110 where it appears as a negative pulse. This negative pulse starts to cut off tube 110, decreasing the current through resistor 112, thereby raising the potential at the plate of tube 110. This causes a positive pulse to go through line 134 and the parallel condenser and resistor 130 to the grid of tube 118, tending to turn this tube on. As tube 118 begins to conduct, its plate potential drops and a negative pulse is impressed through the coupling network onto the grid of tube 110, aiding the action of the "start" pulse. This action is cumulative and the tubes rapidly switch states until tube 118 is conducting and tube 110 is cut off so that the circuit is in "count" or "gate open" condition. The potential at the plate of tube 118 is now relatively low so the potential to the grid of tube 138 from the potentiometer 136 is now negative and tube 138 is cut off. With tube 138 cut off, tube 146 acts as a conventional self-biased triode amplifier with plate load resistor 148, cathode resistor 142 and grid resistor 152. Timing signals coming in on line 2" are now amplified and passed out to the counter via line 6'. Potentiometer 154 serves as an output attenuator and the diode rectifier 155 assures that only signals of the proper polarity will be fed to the counter.

When the preset count is reached, the counter emits a signal which goes to the stop pulse amplifier via line 9'. The stop pulse amplifier consists of tubes 158 and 160 and associated components. Tube 158 is a triode connected as a self-biased amplifier. Tube 160 is a pentode voltage amplifier. Its cathode is connected to ground lead 102 while its grid is connected to a voltage divider between ground and negative potential. The negative bias is adjusted by the potentiometer between grid resistor and ground. A "stop" pulse amplified by tubes 158 and 160 goes through the condensers and diode to the grid of tube 118, reversing the action of the "start" pulse and putting the unit back into the "ready" or "gate" closed condition.

The reset switch 122 permits an operator to close the gate manually when necessary by opening the cathode circuit of tube 118, thereby stopping its conduction and causing tube 110 to conduct. For test purposes a "start" pulse may be introduced manually to line 2' by a switch and battery not shown.

It will be evident that the apparatus described provides for the convenient display of selected portions of a plurality of records without the necessity of resorting to the production of photographic records. The apparatus provides for the reproduction of a plurality of records by each of a plurality of guns of a multigun cathode ray oscilloscope and, by providing a plurality of guns each of which projects a plurality of records, selected portions of a plurality of record channels may be displayed in side by side relation for visual observation. By adjusting the rate of change of the sweep signal, the time duration of the signals produced on the cathode ray oscilloscope screen may be adjusted and, by selectively setting the counter 9, selected portions of the records may be displayed.

It will be evident that the apparatus described may be operated with or without the filter circuits 4 and 4' and with or without adjusting the relative time phase positions of the pick-up heads A, B, C, etc. It will also be evident that the signals from each of the pick-up heads may be delivered individually to a switch circuit of the switches 11 or, alternatively, the outputs from a plurality of pick-up heads may be combined and delivered to a single switch circuit of the switch 11 in order to produce on the oscilloscope screen a single trace resulting from a combination of a plurality of records on the record strip 22. It will also be noted that, while the apparatus described has been in a form including a rotating record mounting drum and magnetic record members, it will be evident that other types of record members and record mounting means may be employed. Similarly, while the specific circuits described are desirably employed, modifications may possibly be made in these circuits. These and other modifications may be made in the embodiment of the invention disclosed herein without departing from the scope of the invention as set forth in the following claims.

What is claimed is:

1. In apparatus for the display of a plurality of seismic signals as aligned separate traces on the screen of a cathode ray oscilloscope having an electron gun, a record of said signals and of a timing signal by which time may be measured along the length of said record, means for scanning said record cyclically and repeatedly and providing individual outputs of said signals, means for measuring time by said timing signal and operative for initiating selectively at corresponding points respectively in the several scanning cycles display intervals equal in duration, means actuated by said display interval initiating means and operative for effecting said equal display intervals, and means operative during each display interval for serially switching said outputs to said electron gun, the switching cycles being large in number during each display interval, said means for effecting equal display intervals being operative for deflecting the electron beam of said gun in a direction to produce said signals in the form of traces on said screen, and said switching means including means for applying said outputs to said electron gun at different voltage levels for deflecting the electron beam of said gun in a direction to effect separation and alignment of said traces.

2. In apparatus for the display of a plurality of seismic signals as aligned separate traces on the screen of a cathode ray oscilloscope having an electron gun, a record of said signals and of a timing signal by which time may be measured along the length of said record, means for scanning said record cyclically and repeatedly and providing individual outputs of said signals, means for measuring time by said timing signal, operative for initiating display intervals equal in duration, and operable for selectively varying the phase relation between the display intervals and the scanning cycles, means actuated by said display interval initiating means and operative for effecting said equal display intervals, and means operative during each display interval for serially switching said outputs to said electron gun, the switching cycles being large in number during each display interval, said means for effecting equal display intervals being operative for deflecting the electron beam of said gun in a direction to produce said signals in the form of traces on said screen, and said switching means including means for applying said outputs to said electron gun at different voltage levels for deflecting the electron beam of said gun in a direction to effect separation and alignment of said traces.

3. In apparatus for the display of a plurality of seismic signals as aligned separate traces on the screen of a cathode ray oscilloscope having an electron gun, a record of said signals and of a timing signal by which time may be measured along the length of said record, means for scanning said record cyclically and repeatedly and providing individual outputs of said signals, means for measuring time by said timing signal, operative for initiating display intervals equal in duration, and operable for selectively varying the phase relation between the display intervals and the scanning cycles, means actuated by said display interval initiating means and operative for effecting said equal display intervals including means for selectively varying the duration of said display intervals, and means operative during each display interval for serially switching said outputs to said electron gun, the switching cycles being large in number during each display interval, said means for effecting equal display intervals being operative for deflecting the electron beam of said gun in a direction to produce said signals in the form of traces on said screen, and said switching means including means for applying said outputs to said electron gun at different voltage levels for deflecting the electron beam of said gun in a direction to effect separation and alignment of said traces.

4. In apparatus for the display of a plurality of seismic signals as aligned separate traces on the screen of a cathode ray oscilloscope having an electron gun, a record of said signals and of a timing signal by which time may be measured along the length of said record, means for scanning said record cyclically and repeatedly and providing individual outputs of said signals, means for measuring time by said timing signal and operative for initiating selectively at corresponding points respectively in the several scanning cycles display intervals equal in duration, means actuated by said display interval initiating means and operative for effecting said equal display intervals, and means operative during each display interval for serially switching said outputs to said electron gun including a pulse generator, a ring counter, and a plurality of switching circuits controlled by outputs of said ring counter stepped by rapidly recurring pulses produced by said generator, the switching cycles being large in number during each display interval, said means for effecting equal display intervals being operative for deflecting the electron beam of said gun in a direction to produce said signals in the form of traces on said screen, and said switching means including means for applying said outputs to said electron gun at different voltage levels for deflecting the electron beam of said gun in a direction to effect separation and alignment of said traces.

5. In apparatus for the display of a plurality of seismic signals as aligned separate traces on the screen of a cathode ray oscilloscope having an electron gun, a record of said signals and of a timing signal by which time may be measured along the length of said record and of a record start signal, means for scanning said record cyclically and repeatedly and providing individual outputs of said signals, means for measuring time by said timing signal and operative for initiating in the several scanning cycles display intervals equal in duration, said display interval initiating means being responsive to said start and timing signals for initiating said display intervals selectively at a predetermined time after the record start, means actuated by said display interval initiating means and operative for effecting said equal display intervals, and means operative during each display interval for serially switching said outputs to said electron gun, the switching cycles being large in number during each display interval, said means for effecting equal display intervals being operative for deflecting the electron beam of said gun in a direction to produce said signals in the form of traces on said screen, and said switching means including means for applying said outputs to said electron gun at different voltage levels for deflecting the electron beam of said gun in a direction to effect separation and alignment of said traces.

6. Apparatus as claimed in claim 5 wherein said display interval initiating means comprises a normally closed gating means responsive to said start and timing signals, said gate being opened in response to the reception of said start signal, and a counter means connected to said gate means to receive said timing signals and to deliver an output for closing said gating means and initiating said display intervals.

References Cited in the file of this patent

UNITED STATES PATENTS

| | | |
|---|---|---|
| 2,378,383 | Arndt | June 19, 1945 |
| 2,484,618 | Fisher | Oct. 11, 1949 |
| 2,594,731 | Connolly | Apr. 29, 1952 |
| 2,611,811 | Yates | Sept. 23, 1952 |
| 2,620,890 | Lee | Dec. 9, 1952 |
| 2,628,689 | Rieber | Feb. 17, 1953 |
| 2,658,579 | Rieber | Nov. 17, 1953 |
| 2,721,990 | McNaney | Oct. 25, 1955 |
| 2,752,092 | McDonal | June 26, 1956 |
| 2,950,459 | Loper et al. | Aug. 23, 1960 |

OTHER REFERENCES

Jakosky: "Geophysics," October 1952, pp. 721–738.